D. E. PHELPS.
LAZY CHAIN.
APPLICATION FILED MAY 31, 1917.
1,254,351. Patented Jan. 22, 1918.
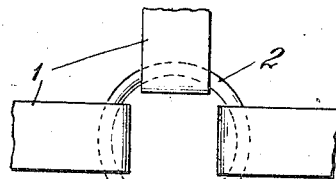
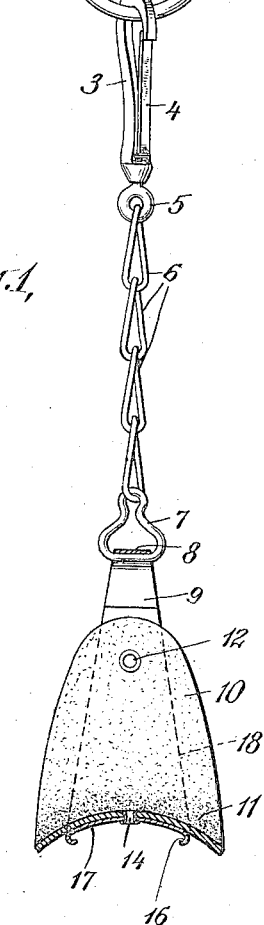
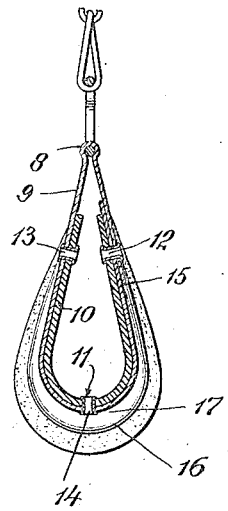
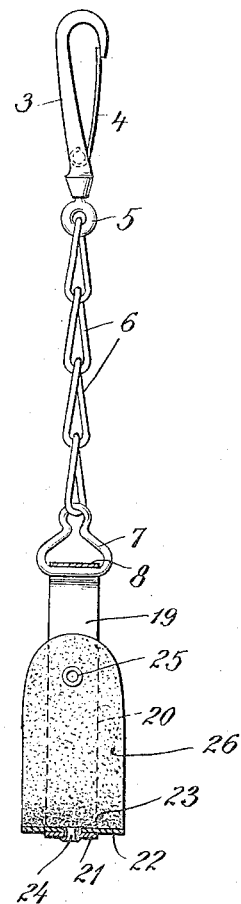
Fig. 1. Fig. 2. Fig. 3.
Inventor
Dexter E. Phelps
Harry L. Duncan, Attorney

UNITED STATES PATENT OFFICE.

DEXTER E. PHELPS, OF WOOSTER, OHIO, ASSIGNOR TO AMERICAN CHAIN COMPANY, INCORPORATED, OF BRIDGEPORT, CONNECTICUT, A CORPORATION OF NEW YORK.

LAZY-CHAIN.

1,254,351.

Specification of Letters Patent.   Patented Jan. 22, 1918.

Application filed May 31, 1917.   Serial No. 171,848.

*To all whom it may concern:*

Be it known that I, DEXTER E. PHELPS, a citizen of the United States, and resident of Wooster, county of Wayne, State of Ohio, have made a certain new and useful Invention Relating to Lazy-Chains, of which the following is a specification taken in connection with the accompanying drawing.

This invention relates especially to chain lazy straps for supporting harness traces. These lazy chains may be provided with a snap hook or similar attaching devices to detachably connect them to the breeching ring or other part of the harness and a plurality of curbed or twisted suspending links may connect to this attaching device a suitable sheet metal or other stirrup support having a looped lower end in which the leather or other trace or harness member is supported, preferably in contact with a liner of leather or the like secured to the inner face of the support.

In the accompanying drawings showing in a somewhat diagrammatic way illustrative embodiments of the invention, Figure 1 is an elevation showing one form of the device parts being shown in section.

Fig. 2 is a partial transverse sectional view thereof; and

Fig. 3 is a similar elevation showing another arrangement.

The attaching device for detachably connecting the lazy chain to the harness element, such as the breeching ring 2 secured in the straps 1, may be a suitable snap hook, such as 3, having a spring tongue 4 to prevent accidental disengagement of the device. A suitable swivel, such as 5, may be provided in connection with the snap hook and the connected curbed or other suspending links 6 may be secured to the stirrup support 9 of sheet metal, for instance, preferably through the interposed connector 7.

This stirrup may be made of enameled sheet iron or other suitable metal or material and may have its upper end 8 bent around the adjacent part of the connector as shown in Fig. 2 so as preferably to allow swinging movement of the support about the same. The sides of this support preferably separate so that their lower part is in the form of a rounded or curved loop in which the trace may loosely rest and the ends of this support member may be connected in any suitable way, as for instance by lapping the short end 15 over the bent end 9 of this support and securing the two together as by a rivet or eyelet 12, as shown in Fig. 2. For some purposes it is desirable to have the metal support strip or member increase in width toward the lower part of the support so that the edges 18 of this support gradually diverge to more securely and easily support the trace. To prevent undesirable wear it is also advantageous in some cases to bend down these edges 17 so as to form a convex supporting surface on the inside of this stirrup carrying the trace, and if desired, the edges of the support may be flanged down adjacent the bottom of the support as at 16. To further minimize wear on the trace a suitable liner of leather or other generally similar material may be mounted within the support and as indicated this liner 10 is shown as having edges 11 which project beyond the metallic support and are preferably bent downward to form a similar convex inner surface which not only prevents undesirable contact between the trace and the edges of the support, but also more or less guards the edges against contact with the animal. If desired, the liner may be riveted or otherwise permanently secured to the support and suitable eyelets, such as 11, 12, 13, may be used for this purpose, the eyelets preferably being countersunk into the leather so as not to undesirably project at the bottom at least. In this way a single eyelet or rivet 12 may connect the ends of the support member and also secure the adjacent part of the liner 10 thereto.

Another arrangement is shown in Fig. 3 as comprising a similar snap hook swivel and connected chain suspending device, the stirrup support being in this instance formed of sheet metal which is shown as having uniform width, the bottom curved loop 21 being thus of the same width as the upper part of this support. A leather or other suitable liner 22 may be mounted within this support as by the eyelets or rivets 24, 25, and the edges 26 of this liner preferably project some distance beyond the edges 20 of the support so as to prevent undesirable contact with the trace, the lower supporting surface 23 of the liner being originally substantially straight, if desired, although it may be bent down somewhat at the edges to approximate more nearly the convex supporting surface shown in Fig. 1. The entire metallic part of this lazy chain may be advantageously coated with enamel or other protective material and a black baked enamel coating gives the device a desirable appearance when a black leather liner is used.

This invention has been described in connection with a number of illustrative embodiments, forms, parts, proportions, materials, and arrangements, to the details of which disclosure the invention is not of course to be limited, since what is claimed as new and what is desired to be secured by Letters Patent is set forth in the appended claims:

1. The lazy chain adapted to support a harness trace, comprising a snap hook attaching device for detachable connection with a breeching ring or the like, a swivel connected to said snap hook, connected curbed suspending links, a sheet metal stirrup support connected to said suspending links through an interposed connector, the side members of said stirrup support increasing in width and separating toward the lower part to form a rounded loop to accommodate the trace, the edges of said support being bent downward and formed with flanged down edges adjacent its bottom portion to form a convex supporting surface in said loop, a leather liner mounted within said loop and having edges projecting beyond the edges of said support and eyelet connectors to secure said liner to said support and to hold together the ends of the support member.

2. The lazy chain adapted to support a harness trace, comprising an attaching device for detachable connection with a breeching ring or the like, connected suspending links, a sheet metal stirrup support connected to said suspending links, the side members of said stirrup support increasing in width and separating toward the lower part to form a rounded loop to accommodate the trace, the edges of said support being bent downward to form a convex supporting surface in said loop, a leather liner mounted within said loop and having edges projecting beyond the edges of said support and connectors to secure said liner to said support.

3. The lazy chain adapted to support a harness trace, comprising an attaching device for detachable connection with a breeching ring or the like, connected suspending links, a sheet metal stirrup support connected to said suspending links, the side members of said stirrup support increasing in width and separating toward the lower part to form a rounded loop to accommodate the trace, the edges of said support being bent downward to form a convex supporting surface in said loop, and a liner mounted within said loop.

4. The lazy chain adapted to support a harness trace or the like, comprising a snap hook attaching device for detachable connection with a breeching ring or the like, a swivel connected to said snap hook, curbed suspending links connected thereto, a sheet metal support connected to said suspending links, the side members of said support being separated toward the lower part to form a rounded loop to accommodate the trace, and a leather liner mounted within said loop and having edges projecting beyond the edges of said support.

5. The lazy chain adapted to support a harness trace or the like, comprising an attaching device for detachable connection with a breeching ring or the like, suspending links connected thereto, a metal support connected to said suspending links, the side members of said support being separated toward the lower part to form a rounded loop to accommodate the trace, and a liner mounted within said loop and having edges projecting beyond the edges of said support.

6. The lazy chain adapted to support a harness trace or the like, comprising a snap hook attaching device for detachable connection with a breeching ring, curbed suspending links connected thereto, a metal stirrup support connected to said suspending links to form a convex surface loop to accommodate the trace, and a leather liner mounted within said loop.

DEXTER E. PHELPS.

Witnesses:
 BETH SPRINKLE,
 DANIEL FUNCK.

Copies of this patent may be obtained for five cents each, by addressing the "Commissioner of Patents, Washington, D. C."